United States Patent [19]

Yamane

[11] 4,385,496

[45] May 31, 1983

[54] INTAKE SYSTEM FOR INTERNAL COMBUSTION ENGINE PROVIDED WITH SUPERCHARGER

[75] Inventor: Ken Yamane, Yokohama, Japan

[73] Assignee: Nissan Motor Co., Ltd., Yokohama, Japan

[21] Appl. No.: 195,975

[22] Filed: Oct. 10, 1980

[30] Foreign Application Priority Data

Oct. 24, 1979 [JP] Japan ............................ 54-146252[U]

[51] Int. Cl.³ ............................................. F02B 33/44
[52] U.S. Cl. ........................................ 60/599; 123/563
[58] Field of Search ............................ 123/563; 60/599

[56] References Cited

U.S. PATENT DOCUMENTS 2,896,598  7/1959  Reggio ............................... 123/563
3,894,392  7/1975  Melchior ............................. 60/599

FOREIGN PATENT DOCUMENTS 665315  9/1938  Fed. Rep. of Germany ........ 60/599
2461101  1/1981  France .

Primary Examiner—Tony M. Argenbright
Attorney, Agent, or Firm—Thompson, Birch, Gauthier & Samuels

[57] ABSTRACT

In an intake system for an internal combustion engine having a supercharger, there are provided a first air passage and a second air passage each for conducting air from the supercharger to the engine. An air cooler is disposed in the first air passage to supply the engine with cooled air, but the second air passage leads air directly from the supercharger to the engine without cooling the air. The air flow rates in the first and the second air passages are controlled by suitable control means to supply the engine with intake air of an appropriate temperature. The control means is intended to restrict the air flow in the first air passage at low engine load to prevent the intake air from being cooled excessively. Preferably the control means is a throttle valve device which comprises a primary throttle valve disposed in a primary throttle bore communicating with the second air passage, and a secondary throttle valve disposed in a secondary throttle bore communicating with the first air passage.

7 Claims, 5 Drawing Figures

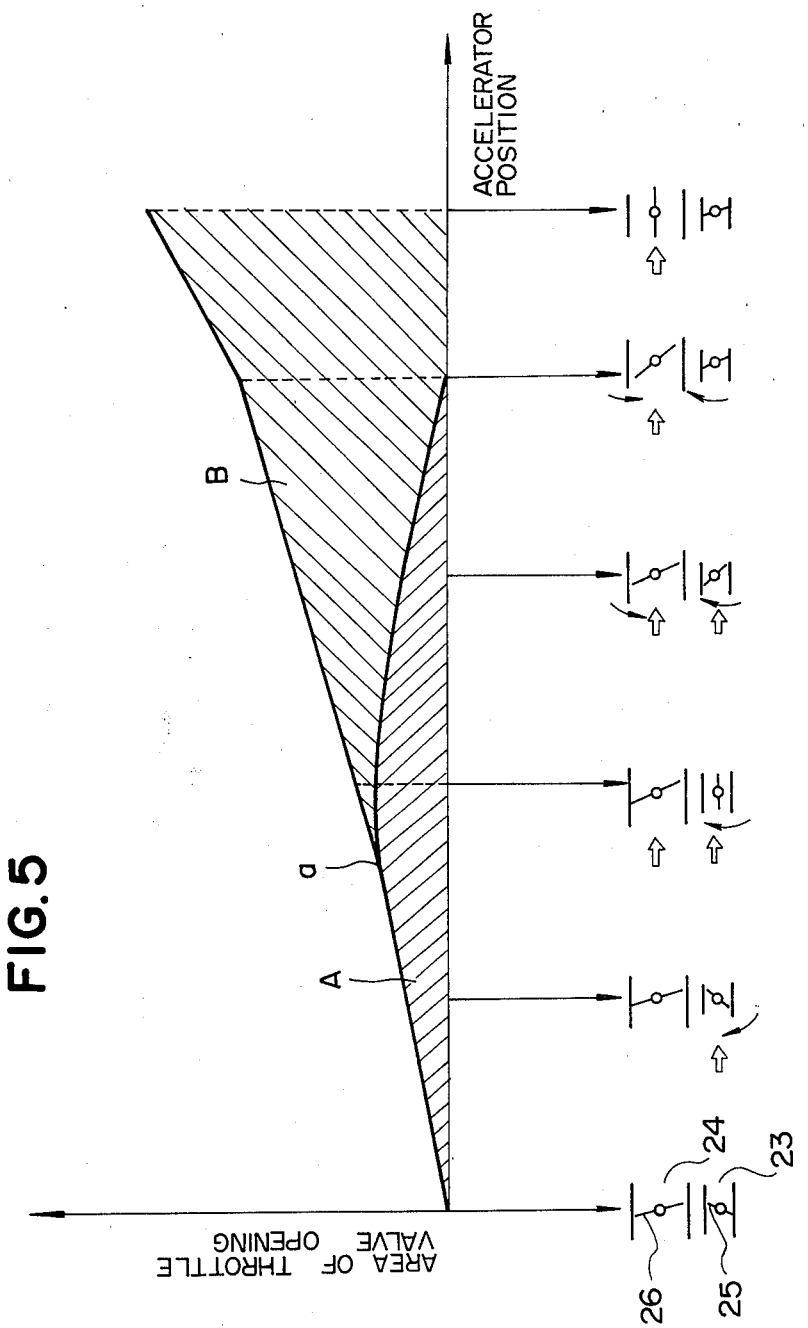

INTAKE SYSTEM FOR INTERNAL COMBUSTION ENGINE PROVIDED WITH SUPERCHARGER

BACKGROUND OF THE INVENTION

1. Field of the Invention

The present invention relates generally to an intake system for an internal combustion engine provided with a supercharger, and more specifically to an intake system which is arranged to lead the air from the supercharger directly to the engine through an air passage bypassing an air cooler under certain engine operating conditions, especially, at low engine load, thereby to prevent the intake air from being cooled excessively, while being capable of sufficiently cooling the intake air at higher engine loads.

2. Description of the Prior Art

A supercharger for an internal combustion engine increases the amount of intake air for the engine by pressurizing the air. The compression of air by a supercharger, however, raises the temperature of the air and increased temperature intake air increases the heat load exerted upon the engine and is liable to cause abnormal combustion such as knock or detonation. Accordingly, it is usual to provide an air cooler between the supercharger and engine to cool the air from the supercharger. However, cool air is rather undesirable under some engine operating conditions. That is, at low speed and low load, low temperature intake air makes combustion incomplete and impairs the engine operation stability and fuel consumption.

SUMMARY OF THE INVENTION

It is therefore an object of the present invention to provide an intake system which is arranged to increase engine operation stability and improve fuel consumption under all engine operating conditions, especially, low speed and low load.

In the intake system of the present invention, there are provided a first air passage and a second air passage, each for conducting air from a supercharger to an engine. The air flowing through the first air passage is cooled by an air cooler disposed in the first air passage between the supercharger and the engine. The second air passage leads the air directly from the supercharger to the engine without cooling the air. There is further provided a control means for controlling the air flow rates in the first air passage and in the second air passage, thereby to control the temperature of the intake air for the engine.

Preferably the control means is a throttle valve device having a primary throttle valve disposed in a primary throttle bore, and a secondary throttle valve disposed in a secondary throttle bore. The secondary air passage communicates with the primary throttle bore, and the first air passage communicates with the secondary throttle bore.

In a preferable design of the throttle valve device, the primary throttle valve is arranged to increase its opening corresponding to accelerator position from an initial fully closed position to a fully open position, and then to decrease its opening corresponding to further displacement of accelerator position to a second fully closed position, and the primary throttle valve is arranged to remain in the second fully closed position regardless of further displacement of accelerator position. On the other hand, the secondary throttle valve is arranged to remain fully closed up to a predetermined accelerator position, then to increase its opening corresponding to accelerator position, and to continue to open further after the primary throttle valve reaches its second fully closed position until the secondary throttle valve reaches its fully open position.

Generally, the primary throttle valve comprises a primary rotatable throttle plate supported on a primary throttle shaft, and the secondary throttle valve comprises a secondary rotatable throttle plate supported on a secondary throttle shaft. The primary and the secondary throttle shafts are linked together and to an accelerator pedal by suitable linkage means. One preferable example of such linkage means is a linkage mechanism which comprises rotatable means rotatably mounted on the primary throttle shaft and linked to the accelerator pedal in such a manner as to rotate corresponding to accelerator position, first link means for transferring the rotation of the rotatable means to the primary throttle shaft, and second link means for transferring the motion of the rotatable means to the second throttle shaft. The first link means is arranged to rotate the primary throttle plate through approximately 180 degrees from the initial fully closed position, through the fully open position to the second fully closed position. Also, the first link means is arranged to permit the rotatable means to further rotate when the primary throttle valve is prevented from further rotating from its second fully closed position. The second link means is arranged to hold the secondary throttle plate fully closed until the rotatable means reaches a predetermined angular position, corresponding to the predetermined accelerator position, and then to rotate the secondary throttle plate through approximately 90 degrees from an initial fully closed position to a fully open position.

The rotatable means may have a pin secured thereto and an arcuate slot formed therein. The first link means may comprise a spring, one end of which is fixed to the primary throttle shaft, and the other end of which is arranged to engage the pin of the rotatable means. The second link means may comprise an arm fixed to the secondary throttle shaft, and a link rod, one end of which is slidably received in the arcuate slot, and the other end of which is pivotally connected to one end of the arm.

BRIEF DESCRIPTION OF THE DRAWINGS

FIG. 5 is a characteristic diagram showing opening and closing operations of the primary throttle valve and the secondary throttle valve according to the present invention.

DETAILED DESCRIPTION OF THE INVENTION

Figure 1:
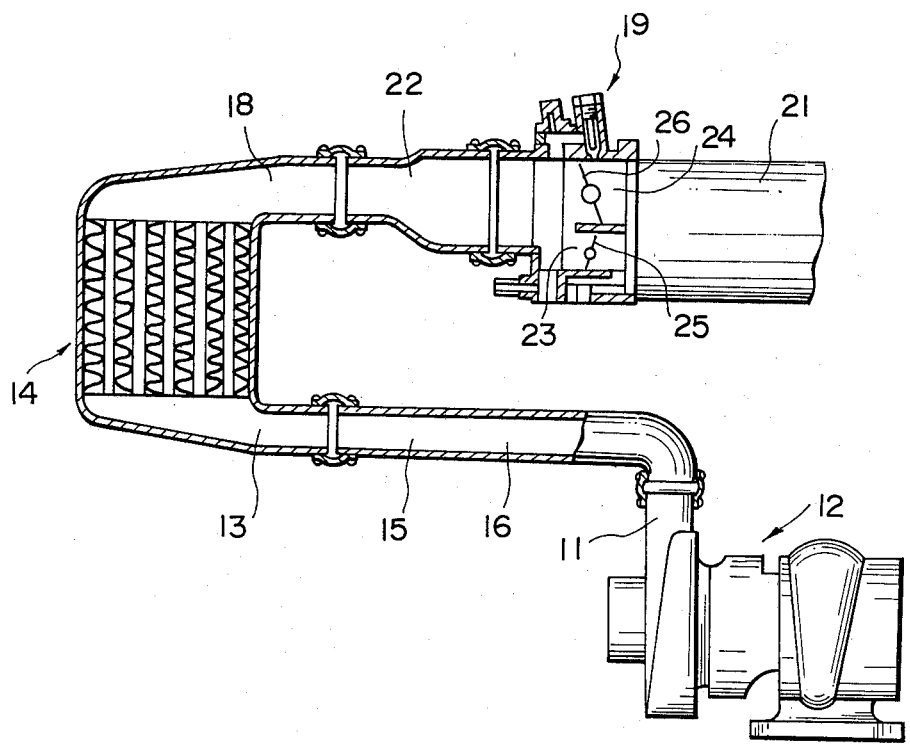
FIG. 1 is a sectional view of a conventional intake system.
Figure 2:
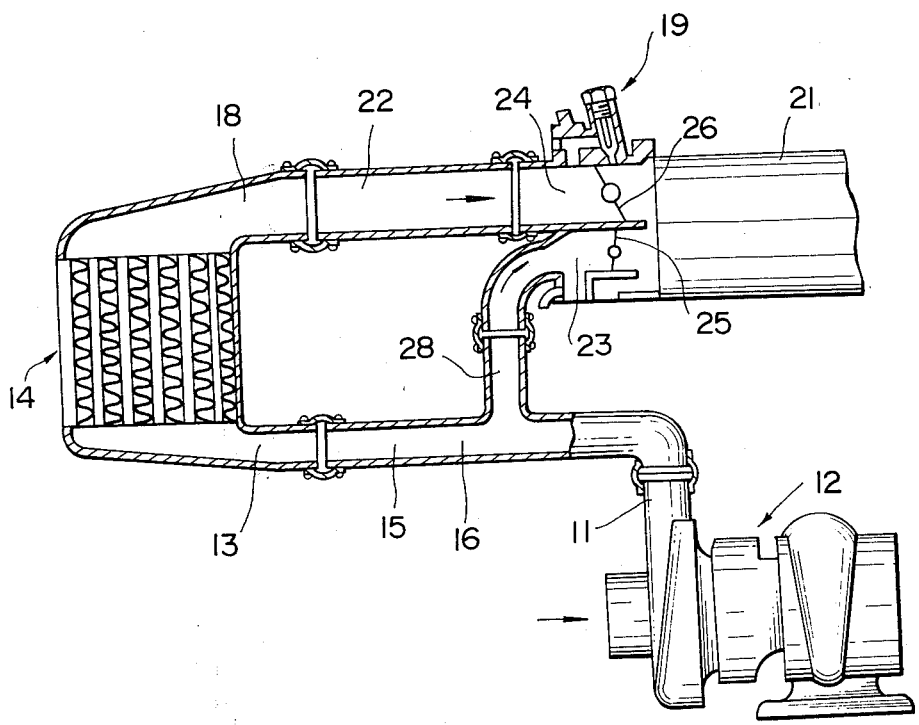
FIG. 2 is a sectional view of an intake system embodying the present invention.

Referring first to FIG. 1, a brief reference will be made to a conventional intake system. In FIG. 1, an air outlet 11 of the compressor side of a turbocharger 12 is connected to an air inlet 13 of an air cooler 14 by a first section 15 of an air passage 16. The air outlet 18 of the air cooler 14 is connected to a throttle valve device 19 and an intake manifold 21 by a second section 22 of the air passage 16. The throttle valve device 19 has a primary throttle bore 23 formed therein and a secondary throttle bore 24 formed therein. In the primary throttle bore 23, there is provided a primary throttle valve 25 designed to operate under all engine operating conditions. In the secondary throttle bore 24, there is provided a secondary throttle valve 26 designed to operate in the engine operating range of medium and high speed and high load. In the thus arranged conventional intake system, all of the intake air for the engine flows through the air cooler 14 regardless of engine operating conditions. However it is undesirable to cool intake air in the low speed and low load range where abnormal combustion such as knocking seldom occurs. In this engine operating range, relatively high temperature intake air is desirable because it improves fuel combustion, increases stability of engine performance at low speed and improves fuel consumption.

In view of the above description, reference is now made to FIGS. 2–5, wherein a preferred embodiment of the intake system of the present invention is shown.

The air outlet 11 of the compressor side of the turbocharger 12 is connected to the air inlet 13 of the air cooler by the first section 15 of the air passage 16. The throttle valve device 19 is disposed at the connecting portion of the intake manifold 21, and the throttle valve device 19 has therein the primary throttle bore 23 and the secondary throttle bore 24. The secondary throttle bore 24 is connected to the air outlet 18 of the air cooler 14 by the second section 22 of the air passage 16, and the primary throttle bore 23 is connected to the first section 15 of the air passage 16 by a branch air passage 28 which branches off from the first section 15 of the air passage 16.

Figure 3:
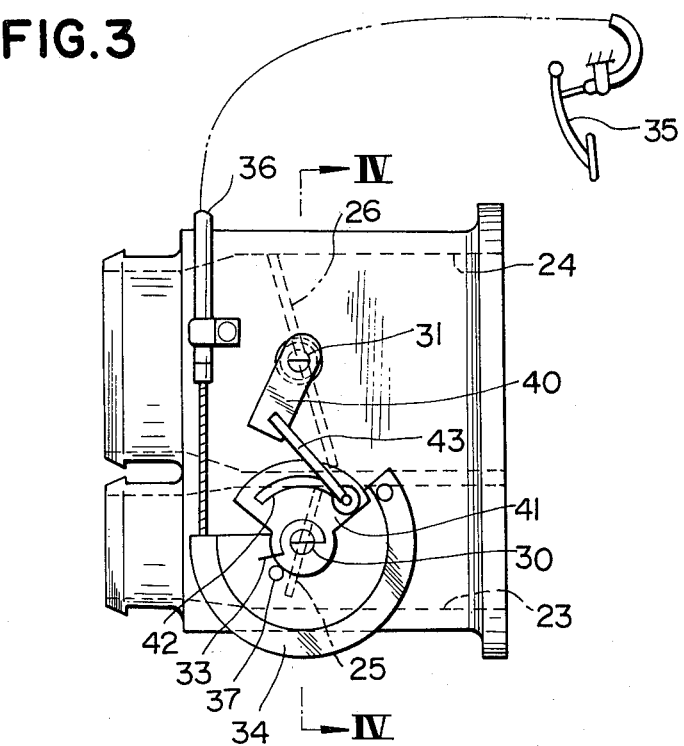
FIG. 3 is an enlarged side view of the throttle valve device of FIG. 2.
Figure 4:
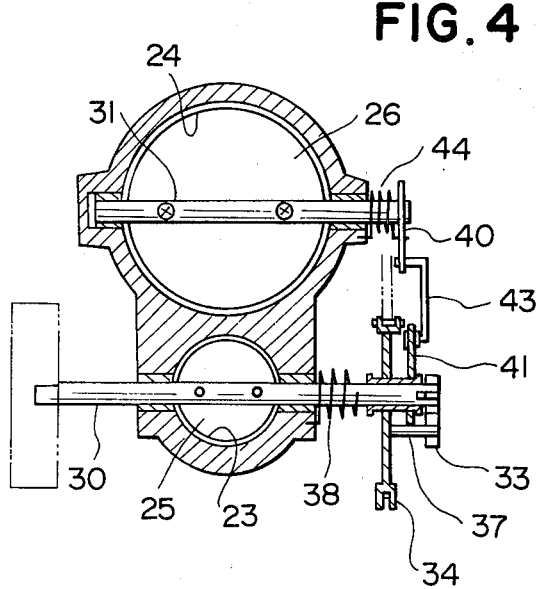
FIG. 4 is a sectional view taken along line IV—IV of FIG. 3.

The throttle valve device 19 has the primary throttle valve 25 supported on a primary throttle shaft 30 in the primary throttle bore 23, and has the secondary throttle valve 26 supported on a secondary throttle shaft 31 in the secondary throttle bore 24. As best shown in FIGS. 3 and 4, a spring 33 and a rotatable plate 34 are mounted on the primary throttle shaft 30. The rotatable plate 34 is linked to an accelerator pedal 35 by a control wire 36 and is arranged to rotate about the primary throttle shaft 30 in correspondence with accelerator position. One end of the spring 33 is fixed to the primary throttle shaft 30 and the other end is arranged to engage a pin 37 embedded in the rotatable plate 34. A return spring 38 is mounted on the primary throttle shaft.

With this arrangement, as the accelerator pedal 35 is depressed gradually, the rotatable plate 34 is rotated corresponding to accelerator position, and this rotational movement thereof is transmitted to the primary throttle shaft 30 by the spring 33. Thus, the primary throttle valve 25 increases its opening up to its fully open position. When the accelerator pedal 35 is further depressed, the primary throttle valve 25 begins to close and decreases its opening corresponding to accelerator position, until it reaches its fully closed position. The primary throttle valve 25 is arranged to remain fully closed at high load when the accelerator pedal 35 is depressed further beyond a position corresponding to the fully closed position of the primary throttle valve. However, the rotatable plate 34 is further rotated by deflecting the spring 33.

An arm 40 is fixed to one end of the secondary throttle shaft 31, and a sector plate 41 is fixed to the rotatable plate 34. The sector plate 41 is arranged to rotate integrally with the rotatable plate 34 and has an arcuate slot 42 formed therein. A link rod 43 is pivotally connected at one of its ends to one end of the arm 40, and the other end of the link rod is slidably received in the arcuate slot 42 of the sector plate 41. Because of the arcuate slot 42 and the associated arrangement, the secondary throttle valve 26 is held fully closed until the primary throttle valve 25 reaches a position just before the fully open position (point a in FIG. 5). After that, the secondary throttle valve 26 begins to open and increases its opening until it reaches its fully open position at high speed. A return spring 44 is mounted on the secondary throttle valve.

Operation of the primary throttle valve 25 and the secondary throttle valve 26 is shown in FIG. 5. The size of the opening of the primary throttle valve 25 is shown by the zone indicated by A, and that of the secondary throttle valve 26 is shown by the zone indicated by B. As shown in FIG. 5, the secondary throttle valve 26 remains fully closed and only the primary throttle valve 25 operates until a certain engine load is reached, so that the total area or size of the opening of the entire throttle valve device 19 is controlled only by the primary throttle valve 25. In the next load range, the secondary throttle valve 26 begins to open and the primary throttle valve 25 decreases its opening. Therefore the total area of opening of the entire throttle valve device 19 is determined by both of the throttle valves 25,26. In the high load range, the primary throttle valve 25 remains fully closed and only the secondary throttle valve 26 operates, so that only the secondary throttle valve 26 controls the total area of the opening.

In the thus arranged intake system, the secondary throttle valve 26 is held fully closed and only the primary throttle valve 25 operates in the low speed and low load engine operating range. Accordingly, the air from the supercharger 12 flows through the branch air passage 28 to the primary throttle bore 23, where the primary throttle valve 25 controls the air flow rate, and then the air flows into the intake manifold 21. Thus, the air does not pass through the air cooler 14 and is not cooled in this engine operating range, so that the temperature of the engine intake air is maintained relatively high. This promotes evaporation of fuel and smoothness of combustion, thereby providing enhanced stability of engine performance and improved fuel economy. In this low speed and low load range, intake air temperature is low because the supercharging rate of the turbocharger is low, and the combustion chamber temperature is low. Therefore, there is almost no possibility of the occurrence of abnormal combustion or knocking.

In the next engine operating range where the engine load increases, the pressure of the air from the turbocharger 12 increases and the air flow rate increases. Accordingly, the temperature of the air from the turbocharger 12 increases. In this engine operating range, however, the secondary throttle valve 26 begins to open and the air cooled in the air cooler 14 begins to flow through the secondary throttle bore 24 into the intake manifold 21. Thus, the air which is cooled to some extent is supplied to the engine in this operating range and this reduces the knocking tendency.

In the high speed and high load range, the temperature of the compressed air from the turbocharger increases correspondingly. Additionally, in this range, the combustion chamber temperature increases drastically. Therefore, according to the present invention, the primary throttle valve 25 remains fully closed, and only the air cooled in the cooler and flowing through the secondary throttle valve 24 enters the intake manifold 21 and engine combustion chamber. By so doing, more complete combustion is achieved and the tendency of the engine to knock is reduced.

What is claimed is:

1. An air intake system connecting a supercharger to an internal combustion engine, said air intake system comprising:
    (a) a first air passage for conducting the air from the supercharger to the engine;
    (b) an air cooler disposed in said first air passage between the supercharger and the engine;
    (c) a second air passage for conducting the air directly from the supercharger to the engine bypassing said air cooler; and
    (d) control means for controlling the air flow rates in said first air passage and said second air passage, thereby controlling the temperature of the intake air for the engine, said control means comprising a throttle device having:
        (i) a primary throttle bore formed at the downstream end of said second air passage and a primary throttle valve mounted in said primary throttle bore; and
        (ii) a secondary throttle bore formed at the downstream end of said first air passage and a secondary throttle valve mounted in said secondary throttle bore.

2. The intake system as in claim 1, wherein
    (a) said primary throttle valve is arranged to increase its opening corresponding to accelerator position from an initial fully closed position to a fully open position, then to decrease its opening corresponding to further displacement of accelerator position to a second fully closed position, and to remain in said second fully closed position regardless of a still further displacement of accelerator position, and wherein
    (b) said secondary throttle valve is arranged to remain fully closed up to a predetermined accelerator position, then to increase its opening corresponding to accelerator position, and to continue to increase its opening after said primary throttle valve reaches said second fully closed position until said secondary throttle valve reaches its fully open position.

3. The intake system as in claim 2, wherein said predetermined accelerator position is chosen so that said secondary throttle valve begins to open just when said primary throttle valve reaches its fully open position.

4. The intake system as in claim 2, wherein said predetermined accelerator position is chosen so that said secondary throttle valve begins to open just before said primary throttle valve reaches its fully open position.

5. The intake system as in claim 2, wherein said primary throttle valve comprises a primary rotatable throttle plate supported on a primary throttle shaft and said secondary throttle valve comprises a secondary rotatable throttle plate supported on a secondary throttle shaft, both of said primary and secondary throttle shafts being linked to an accelerator pedal by a linkage mechanism which comprises:
    (a) a rotatable means rotatably mounted on said primary throttle shaft and linked to the accelerator pedal in a manner to rotate corresponding to accelerator position;
    (b) first link means arranged to transfer the rotation of said rotatable means to said primary throttle shaft to rotate said primary throttle plate through approximately 180 degrees from said initial fully closed position through said fully open position to said second fully closed position, said first link means being arranged to permit said rotatable means to further rotate when said primary throttle plate is prevented from further rotating at said second fully closed position;
    (c) second link means arranged to transfer the motion of said rotatable means to said secondary throttle shaft to rotate said secondary throttle plate through approximately 90 degrees from an initial fully closed position to a fully open position, said second link means being arranged to hold said secondary throttle plate fully closed until said rotatable means reaches a predetermined angular position corresponding to said predetermined accelerator position.

6. The intake system as in claim 5, wherein
    (a) said rotatable means has a pin secured thereto and an arcuate slot formed therein;
    (b) said first link means comprises a spring, one end of which is fixed to said primary throttle shaft, said pin being arranged to engage the other end of said spring to transfer the rotation of said rotatable means to said primary throttle shaft; and
    (c) said second link means comprises an arm fixed to said secondary throttle shaft and a link rod, one end of which is slidably received in said arcuate slot and the other end of which is pivotally connected to one end of said arm.

7. The intake system as in claim 1, wherein said secondary throttle bore has a larger diameter than said primary throttle bore.

* * * * *